United States Patent
Wilson et al.

(10) Patent No.: US 6,861,192 B2
(45) Date of Patent: Mar. 1, 2005

(54) CROSSLINKED BINDER POLYMERS FOR ELECTROSTATOGRAPHIC TONERS AND TONERS FORMED THEREFROM

(75) Inventors: John C. Wilson, Rochester, NY (US); Thomas A. Jadwin, Rochester, NY (US); Paul L. Nielsen, Lima, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/187,551

(22) Filed: Jul. 2, 2002

(65) Prior Publication Data

US 2003/0069368 A1 Apr. 10, 2003

Related U.S. Application Data

(60) Provisional application No. 60/307,783, filed on Jul. 25, 2001.

(51) Int. Cl.$^7$ ................................................ G03G 9/087
(52) U.S. Cl. .................................... 430/109.5; 525/437
(58) Field of Search ........................ 525/437; 430/109.5

(56) References Cited

U.S. PATENT DOCUMENTS

| | | | |
|---|---|---|---|
| 3,938,992 A | | 2/1976 | Jadwin et al. |
| 4,096,133 A | * | 6/1978 | Zweigle ........................ 526/23 |
| 5,276,127 A | | 1/1994 | Takyu et al. |
| 5,373,084 A | | 12/1994 | Chang |
| 5,486,444 A | | 1/1996 | Bayley et al. |
| 5,714,293 A | | 2/1998 | Wilson et al. |
| 5,789,527 A | | 8/1998 | Nakamichi et al. |

FOREIGN PATENT DOCUMENTS

| | | | |
|---|---|---|---|
| EP | 0 427 273 A | | 5/1991 |
| JP | 2001209211 | | 8/2001 |
| JP | 2001 209211 | * | 8/2001 |
| WO | WO-01 02505 A | | 1/2001 |

OTHER PUBLICATIONS

EPO Search Report on EP Application No. 02015563.6, dated Jul. 23, 2003 (four pages).
EPO Search Report on EP Application No. 02015563.6, dated Dec. 9, 2003 (five pages).

* cited by examiner

*Primary Examiner*—John L Goodrow
(74) *Attorney, Agent, or Firm*—James A. Cairns

(57) ABSTRACT

A binder polymer composition for electrostatographic toners comprises a carboxysubstituted precursor polymer crosslinked by reaction with an N,N,N'N'-tetrakis(2-hydroxyalkyl) bisamide compound of the structure

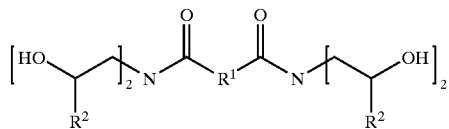

wherein $R^1$ is a substituted or unsubstituted alkylene group containing 1 to about 10 carbon atoms and $R^2$ is H or an alkyl group containing 1 to about 6 carbon atoms.

38 Claims, No Drawings

US 6,861,192 B2

CROSSLINKED BINDER POLYMERS FOR ELECTROSTATOGRAPHIC TONERS AND TONERS FORMED THEREFROM

CROSS-REFERENCE TO RELATED APPLICATION

In accordance with 37 CFR §1.78(5), this application claims the benefit of copending provisional application Ser. No. 60/307,783, filed Jul. 25, 2001, for CROSSLINKED BINDER POLYMERS FOR ELECTROSTATOGRAPHIC TONERS AND TONERS FORMED THEREFROM.

FIELD OF THE INVENTION

The present invention relates to electrostatographic toners and, in particular, to crosslinked binder polymers useful for preparing toner particles.

BACKGROUND OF THE INVENTION

Crosslinked polymeric materials have long been known as useful binders for electrostatographic toners. Various types of crosslinked polymers, including vinyl, styryl, and acrylic resins, as well as condensation polymers such as polyesters are disclosed in U.S. Pat. No. 3,938,992 and in Reissue Patent No. 31,072.

Other references describing toners formed from crosslinked polyesters include the following, the disclosures of which are incorporated herein by reference:

U.S. Pat. No. 5,276,127, which describes a crosslinked polyester derived from at least one member selected from the group consisting of tribasic and tetrabasic acid components and trihydric and tetrahydric alcohol components and an aromatic or alicyclic diol component in which at least one of the hydroxyl groups is a secondary group.

U.S. Pat. No. 5,486,444, which describes a process for preparing a crosslinked polyester by first forming a polyhydroxy functional polyester resin precursor, which is then reacted with a dianhydride or diepoxy functional crosslinking component.

U.S. Pat. No. 5,789,527, which describes a polyester resin formed by linking crosslinked low-molecular weight polyesters through a dicarboxylic linking agent.

In addition to their usefulness for the production of toners, crosslinked polyesters have found extensive use in various other applications, for example, the production of thermosetting powder coating compositions. Such compositions are disclosed in, for example, U.S. Pat. No. 5,373,084, which describes the preparation of semicrystalline polyester plasticizers from crosslinkable resins and a variety of crosslinking agents. Among the types of crosslinking agents disclosed in this reference are hydroxyalkylamides, epoxy materials, glycouril compounds, and unblocked or blocked isocyanates.

Commercial polyester crosslinking chemistries frequently involve materials that are toxic or malodorous and, in addition, require in their preparation catalysts that may adversely affect the triboelectric performance of the toner particles. Furthermore, catalyzed processes often require an intimate knowledge of the materials and processes used by suppliers in the preparation of toner ingredient precursors. It would be highly desirable to have the ability to prepare crosslinked polyester toner binders using non-toxic, odorless, low cost ingredients under relatively mild conditions that do not require catalysts.

SUMMARY OF THE INVENTION

The present invention is directed to a binder polymer composition for electrostatographic toners that comprises a carboxysubstituted precursor polymer crosslinked by reaction with an N,N,N'N'-tetrakis(2-hydroxyalkyl) bisamide compound of the structure:

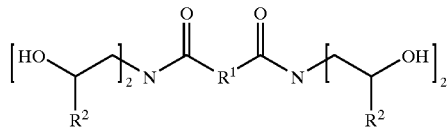

wherein $R^1$ is a substituted or unsubstituted alkylene group containing 1 to about 10 carbon atoms and $R^2$ is H or an alkyl group containing 1 to about 6 carbon atoms.

DETAILED DESCRIPTION OF THE INVENTION

Unless otherwise specifically stated, the terms "substituted" or "substituent" in this specification are used to refer to any group or atom other than hydrogen. Also, the term "group", when used to refer to a substituent that includes a substitutable hydrogen, encompasses not only the substituent's unsubstituted form but also its form substituted with any substituent or group that does not interfere with formation of the precursor polymer or its subsequent reaction with the crosslinking agent.

The present invention relates to binder polymers for toners that are produced by the reaction of a crosslinking agent comprising an N,N,N'N'-tetrakis(2-hydroxyalkyl) bisamide compound with a carboxysubstituted precursor polymer, without the need for triboelectrically altering catalysts. Most preferably, the carboxysubstituted precursor polymers are polyesters that are the reaction products of fumaric acid with alkoxylated Bisphenol A, which are crosslinked with a bisamide compound that preferably is N,N,N',N'-tetrakis(2-hydroxyethyl)succinamide, N,N,N',N'-tetrakis(2-hydroxyethyl)adipamide, N,N,N',N'-tetrakis(2-hydroxyethyl)sebacamide, or N,N,N',N'-tetrakis(2-hydroxypropyl)adipamide. The bisamide crosslinking agent is employed in an amount preferably about 0.1 to about 5, more preferably, about 0.5 to about 3 weight percent of the amount of carboxysubstituted precursor polymer.

Two of the aforementioned N,N,N'N'-tetrakis(2-hydroxyalkyl)alkylenebisamides preferred in the practice of the present invention are available from Ems-Chemie AG, Zurich, Switzerland and are designated by the product names PRIMID® XL-552 and PRIMID® QM-1260. The chemical structures of these materials are as shown below:

Primid XL-552

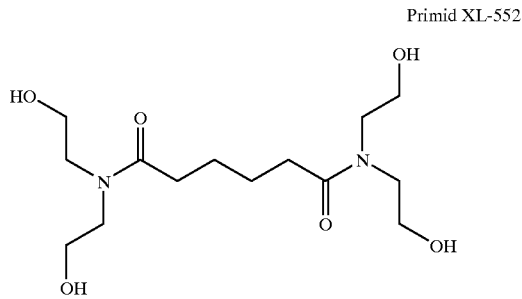

-continued

Primid QM-1260

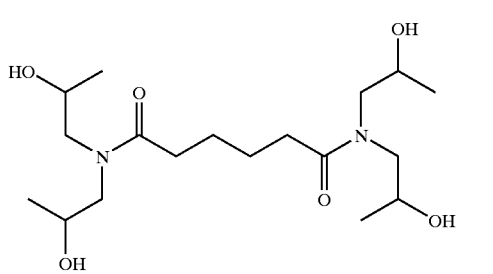

Preferred carboxysubstituted precursor polymers for the practice of the present invention are polyesters bearing pendant and/or terminal carboxyl groups, as represented by the following general formula:

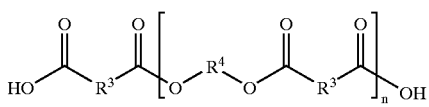

wherein $R^3$ is a substituted or unsubstituted alkylene group containing 1 to about 6 carbon atoms or a substituted or unsubstituted arylene group containing 6 to about 16 carbon atoms; $R^4$ is a substituted or an unsubstituted alkylene group containing 1 to about 6 carbon atoms, or a substituted or unsubstituted arylene, alkylenediarylene, or arylenedialkylene group containing 6 to about 20 carbon atoms.

Representative $R^3$ groups include, for example, 1,2-ethanediyl, 1,2-ethenediyl, 1,4-butanediyl, hexamethylene, 1,4-phenylene, 1,3-phenylene, 4-carboxy-1,3-phenylene, 1,1,3-trimethyl-3-(4-phenylene)-5-yl, 2,6-naphthalenediyl, 5-hydroxy-1,3-phenylene, and 2-chloro-1,4-phenylene groups. Representative $R^4$ groups include, for example, 1,2-ethanediyl, 2,2-dimethyl-1,3-propanediyl, 2-carboxy-2-methyl-1,3-propanediyl, 1,4-butanediyl, 1,4-cyclohexanedimethylene, hexamethylene, 2,2'-oxydiethylene, 4,4'-isopropylidenediphenylene, and 1,4-phenylene groups.

The carboxysubstituted precursor polyesters may contain more than one $R^3$ and $R^4$ group and may also include the residue of a polyol or polyacid with a functionality greater than 2, thus providing a branched structure.

A particularly preferred class of carboxysubstituted polyesters are reaction products of fumaric acid, maleic acid, or maleic anhydride with a glycol. Preferably, the glycol is an alkoxylated derivative of Bisphenol A, represented by the following general structure:

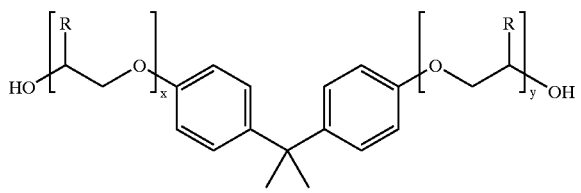

wherein R is H or methyl, and x+y has a value 2.0 to 20.0. The glycol may be a mixture containing both primary and secondary hydroxy substituents. Most preferably, the carboxysubstituted polyester is derived from fumaric acid and propoxylated Bisphenol A, where R is methyl and x+y=2.2. This most preferred polyester is a branched polymer resulting from hydro-alkoxy additions across the fumarate double bonds.

Another preferred group of carboxysubstituted precursor polymers are vinyl polymers, represented by the following structural formula:

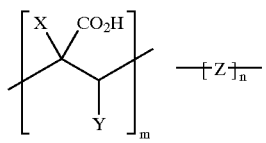

wherein X is H or methyl, Y is H, $CO_2H$, $CO_2R^5$, or $CONHR^6$, $R^5$ and $R^6$ each independently represents alkyl groups containing 1 to about 3 carbon atoms, Z represents the residue(s) of any copolymerizable monomer(s), m and n are weight percentages whose total is 100, and m has a value from about 0.01 to 100.0. Monomers corresponding to Z can be, for example, olefinic, styrenic, acrylic, and methacrylic monomers, and mixtures thereof.

A representative carboxysubstituted vinyl polymer is shown below:

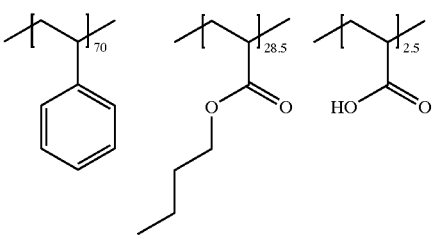

Also in accordance with the present invention, a mixture of carboxysubstituted polyesters or a mixture of carboxysubstituted vinyl polymers, or a mixture of one or more carboxysubstituted polyesters with one or more carboxysubstituted vinyl polymers may be employed.

Various addenda may be added to the toner formulation. These addenda include but are not restricted to materials such as colorants (either pigments or dyes), charge control agents, waxes, and low surface energy additives.

Measurement of the rheological properties of a polymer is useful for determining its suitability as a toner binder polymer, in particular, for forming a toner image that is fixed to a paper receiver using a heated roll. Useful polymers have a viscosity, as measured on a dynamic viscometer at 120° C. and 1 radian/second, of preferably about 20 kpoise to about 200 kpoise, more preferably about 40 kpoise to about 140 kpoise.

Storage modulus is a measure of the elastic nature of a polymer and provides some indication of the operating range of a heated roll without resulting in offset. Polymers useful for toners should have a storage modulus of preferably at least about 20 kdyne/cm$^2$, more preferably, at least about 35 kdyne/cm$^2$.

Tan delta, which is the ratio of the loss modulus to the storage modulus, gives an indication of the viscous vs the elastic characteristics of a polymer. For use in toners, polymers preferably should have a tan delta value of less than about 2, more preferably, of less than about 1.

The following examples are illustrative of the present invention:

EXAMPLE 1

Crosslinking Propoxylated Bisphenol-A Fumarate Polyester with N,N,N',N'-tetrakis(2-hydroxyethyl) adipamide at 0.5% Crosslinking Agent Level 47.76 g of a propoxylated bisphenol-A fumarate polyester, available as 382ES-HMW from Reichhold Chemicals, Inc., was dry-blended with 0.24 g of N,N,N',N'-tetrakis(2-hydroxyethyl)adipamide (PRIMID® XL-552). The mixture was placed in a laboratory mixer, available from C. W. Brabender, Inc., equipped with sigma blades that had been preheated to 235° C. The mixing speed was set at 150 rpm, and total mixing time was 4 minutes. The rheology of the polyester before and after crosslinking was determined on a dynamic viscometer, available from Rheometrics, Inc., at 120° C. and 1 radian/second:

| Identification | Viscosity (kpoise) | Storage Modulus (kdyne/cm$^2$) | Tan Delta |
|---|---|---|---|
| Polyester before crosslinking | 19 | 3.7 | 5.00 |
| Polyester after crosslinking with 0.5% PRIMID ® XL-552 | 59 | 38 | 1.22 |

EXAMPLE 2

Crosslinking Propoxylated Bisphenol-A Fumarate Polyester with N,N,N',N'-tetrakis(2-hydroxyethyl) adipamide at 1% Crosslinking Agent Level The same procedure as in Example 1 was used, except that 47.52 g of the propoxylated bisphenol-A fumarate polyester was mixed with 0.48 g of PRIMID® XL-552. The rheology of the polyester before and after crosslinking was:

| Identification | Viscosity (kpoise) | Storage Modulus (kdyne/cm$^2$) | Tan Delta |
|---|---|---|---|
| Polyester before crosslinking | 19 | 3.7 | 5.00 |
| Polyester after crosslinking with 1% PRIMID ® XL-552 | 115 | 92 | 0.74 |

EXAMPLE 3

Crosslinking Propoxylated Bisphenol-A Fumarate Polyester with N,N,N',N'-tetrakis(2-hydroxyethyl) adipamide at 3% Crosslinking Agent Level The same procedure as in Example 1 was used, except that 46.56 g of the propoxylated bisphenol-A fumarate polyester was mixed with 1.44 g of PRIMID® XL-552. The rheology of the polyester before and after crosslinking was:

| Identification | Viscosity (kpoise) | Storage Modulus (kdyne/cm$^2$) | Tan Delta |
|---|---|---|---|
| Polyester before crosslinking | 19 | 3.7 | 5.00 |
| Polyester after crosslinking with 3% PRIMID ® XL-552 | 129 | 127 | 0.21 |

EXAMPLE 4

Crosslinking Propoxylated Bisphenol-A Fumarate Polyester with N,N,N',N'-tetrakis(2-hydroxypropyl) adipamide at 0.5% Crosslinking Agent Level The same procedure as Example 1 was used except 47.76 g of the propoxylated bisphenol-A fumarate polyester was mixed with 0.24 g PRIMID® QM-1260. The rheology of the polyester before and after crosslinking was:

| Identification | Viscosity (kpoise) | Storage Modulus (kdyne/cm$^2$) | Tan Delta |
|---|---|---|---|
| Polyester before crosslinking | 19 | 3.7 | 5.00 |
| Polyester after crosslinking with 0.5% PRIMID ® QM-1260 | 54 | 31 | 1.38 |

EXAMPLE 5

Crosslinking Propoxylated Bisphenol-A Fumarate Polyester with N,N,N',N'-tetrakis(2-hydroxypropyl) adipamide at 1% Crosslinking Agent Level The same procedure as in Example 4 was used, except that 47.52 g of the propoxylated bisphenol-A fumarate polyester was mixed with 0.48 g of PRIMID® QM-1260. The rheology of the polyester after crosslinking was:

| Identification | Viscosity (kpoise) | Storage Modulus (kdyne/cm$^2$) | Tan Delta |
|---|---|---|---|
| Polyester before crosslinking | 19 | 3.7 | 5.00 |
| Polyester after crosslinking with 1% PRIMID ® QM-1260 | 93 | 74 | 0.76 |

EXAMPLE 6

Crosslinking a Carboxysubstituted 2,2-dimethyl-1,3-propylene Terephthalate Polyester with N,N,N',N'-tetrakis(2-hydroxyethyl)adipamide at 1% Crosslinker Level The same procedure as in Example 1 was used, except that 47.52 g of a carboxysubstituted 2,2-dimethyl-1,3-propylene terephthalate polyester, prepared by Ruco Polymers Inc. and designated PE 2073, was mixed with 0.48 g of PRIMID® XL-552. The rheology before and after crosslinking was:

| Identification | Viscosity (kpoise) | Storage Modulus (kdyne/cm$^2$) | Tan Delta |
|---|---|---|---|
| Polyester before crosslinking | 47 | 11 | 4.00 |
| Polyester after crosslinking with 1% PRIMID ® XL-552 | 170 | 137 | 0.72 |

EXAMPLE 7

Crosslinking Propoxylated Bisphenol-A Fumarate Polyester with N,N,N',N'-tetrakis(2-hydroxyethyl) adipamide in an Extruder at 0.5% Crosslinker Level 9950 g of propoxylated bisphenol-A fumarate polyester (382ES-HMW) was dry-blended with 50 g PRIMID® XL-552 and processed with a twin-screw co-rotating extruder Model ZSK-30, available from Werner & Pfleiderer Corp. Feed rate was 10 kg/hr, screw speed was 300 rpm, and zone temperature setpoints were: zone 1—93° C., zones 2–5—216° C. The polyester before and after crosslinking was measured in the same manner as in Example 1 to obtain the following results:

| Identification | Viscosity (kpoise) | Storage Modulus (kdyne/cm²) | Tan Delta |
|---|---|---|---|
| Polyester before crosslinking | 19 | 3.7 | 5.00 |
| Polyester after crosslinking with 0.5% PRIMID ® XL-552 | 46 | 35 | 0.87 |

EXAMPLE 8

Crosslinking Propoxylated Bisphenol-A Fumarate Polyester with N,N,N',N'-tetrakis(2-hydroxyethyl) adipamide in an Extruder at 1% Crosslinker Level 9900 g of propoxylated bisphenol-A fumarate polyester (382ES-HMW) was dry-blended with 100 g PRIMID® XL-552 and processed with the Model ZSK-30 twin-screw co-rotating extruder. Feed rate was 10 kg/hr, screw speed was 300 rpm, and zone temperature setpoints were: zone 1—93° C., zones 2–5—216° C. The polyester before and after crosslinking was measured in the same manner as in Example 1, giving the following results:

| Identification | Viscosity (kpoise) | Storage Modulus (kdyne/cm²) | Tan Delta |
|---|---|---|---|
| Polyester before crosslinking | 19 | 3.7 | 5.00 |
| Polyester after crosslinking with 1% PRIMID ® XL-552 | 81 | 71 | 0.55 |

EXAMPLE 9

Crosslinking Propoxylated Bisphenol-A Fumarate Polyester with N,N,N',N'-tetrakis(2-hydroxypropyl) adipamide in an Extruder at 0.5% Crosslinker Level 9950 g of propoxylated bisphenol-A fumarate polyester (382ES-HMW) was dry-blended with 50 g PRIMID® QM-1260 and processed with the Model ZSK-30 twin-screw co-rotating extruder. Feed rate was 10 kg/hr, screw speed was 300 rpm, and zone temperature setpoints were: zone 1—93° C., zones 2–5—216° C. The polyester before and after crosslinking was measured in the same manner as Example 1 to give the following results:

| Identification | Viscosity (kpoise) | Storage Modulus (kdyne/cm²) | Tan Delta |
|---|---|---|---|
| Polyester before crosslinking | 19 | 3.7 | 5.00 |
| Polyester after crosslinking with 0.5% PRIMID ® QM-1260 | 46 | 30 | 1.18 |

EXAMPLE 10

Crosslinking Propoxylated Bisphenol-A Fumarate Polyester with N,N,N',N'-tetrakis(2-hydroxypropyl) adipamide in an Extruder at 1% Crosslinker Level 9900 g of propoxylated bisphenol-A fumarate polyester (382ES-HMW) was dry-blended with 100 g PRIMID® QM-1260 and processed with the Model ZSK-30 twin-screw co-rotating extruder. Feed rate was 10 kg/hr, screw speed was 300 rpm, and zone temperature setpoints were: zone 1—93° C., zones 2–5—216° C. The polyester before and after crosslinking was measured in the same manner as in Example 1:

| Identification | Viscosity (kpoise) | Storage Modulus (kdyne/cm²) | Tan Delta |
|---|---|---|---|
| Polyester before crosslinking | 19 | 3.7 | 5.00 |
| Polyester after crosslinking with 1% PRIMID ® QM-1260 | 92 | 78 | 0.62 |

EXAMPLE 11

Preparation of N,N,N',N'-tetrakis(2-hydroxyethyl) succinamide

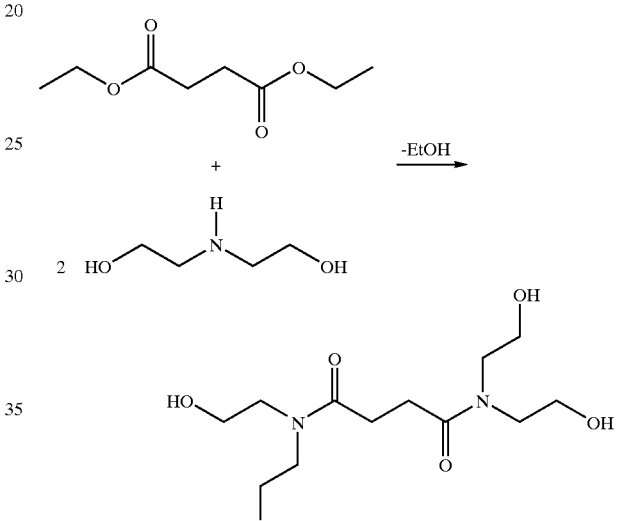

A mixture of 43.55 g (0.25 mol) of diethyl succinate and 157.71 g (1.50 mol) of diethanolamine was heated under nitrogen in a 140° C. bath for 1.75 hr while collecting the ethanol distillate. The excess diethanolamine was then distilled off at reduced pressure (1.2 mm) while heating in a 190° C. bath. The oily residue was cooled, stirred with acetone, and allowed to stand. The oil crystallized to a white solid, which was collected and dried. The yield of product was 48.27 g (66.0% of theory); mp=89–91° C.

EXAMPLE 12

Preparation of N,N,N',N'-tetrakis(2-hydroxyethyl) sebacamide

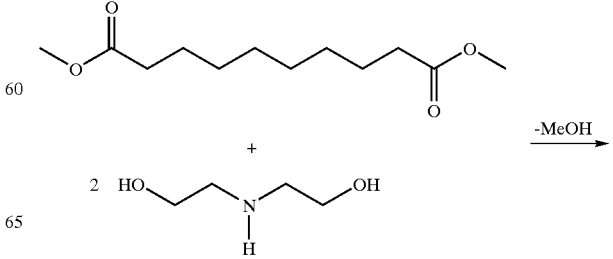

-continued

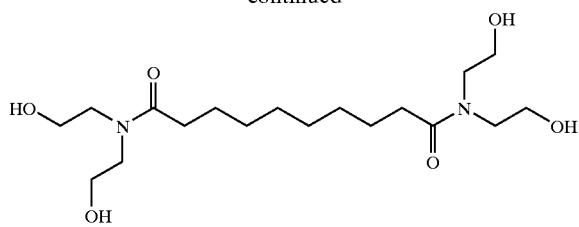

A mixture of 57.58 g (0.25 mol) dimethyl sebacate and 157.71 g (1.50 mol) of diethanolamine was heated in a 140° C. bath under nitrogen for 2.5 hrs while collecting the methanol condensate. The reaction mixture was subsequently heated in a 200° C. at reduced pressure (1.5 mm) to distill off excess diethanolamine. The highly viscous oily residue was dissolved in an equal volume of acetone and stirred overnight. The resulting crystalline solid was collected, washed with acetone, and dried. The yield of product was 35.0 g (9.3% of theory); mp=87–98° C.

EXAMPLE 13

Crosslinking Propoxylated Bisphenol-A Fumarate Polyester with N,N,N',N'-tetrakis(2-hydroxyethyl) succinamide at 1% Crosslinking Agent Level The same procedure as in Example 1 was used, except that 47.52 g of a propoxylated bisphenol-A fumarate polyester was mixed with 0.48 g of N,N,N',N'-tetrakis(2-hydroxyethyl)succinamide, prepared as described in Example 11. The rheology of the polyester before and after crosslinking was:

| Identification | Viscosity (kpoise) | Storage Modulus (kdyne/cm$^2$) | Tan Delta |
|---|---|---|---|
| Polyester before crosslinking | 19 | 3.1 | 6.24 |
| Polyester after crosslinking with 1% N,N,N',N'-tetrakis-(2-hydroxyethyl)succinamide | 133 | 97 | 0.93 |

EXAMPLE 14

Crosslinking Propoxylated Bisphenol-A Fumarate Polyester with N,N,N',N'-tetrakis(2-hydroxyethyl) sebacamide at 1% Crosslinking Agent Level The same procedure as in Example 1 was used, except that 47.52 g of a propoxylated bisphenol-A fumarate polyester was mixed with 0.48 g of N,N,N',N'-tetrakis(2-hydroxyethyl)sebacamide, prepared as described in Example 12. The rheology of the polyester before and after crosslinking was:

| Identification | Viscosity (kpoise) | Storage Modulus (kdyne/cm$^2$) | Tan Delta |
|---|---|---|---|
| Polyester before crosslinking | 19 | 3.1 | 6.24 |
| Polyester after crosslinking with 1% N,N,N',N'-tetrakis (2-hydroxyethyl)sebacamide | 126 | 89 | 1.00 |

EXAMPLE 15

Preparation of a Toner

The crosslinked polymer of Example 8 was used to prepare a toner by melt-blending the following ingredients on a two-roll mill for 15 minutes at 120° C.: 30 grams of the crosslinked polyester of Example 8, 2.4 grams of REGAL® 330 carbon black (from Cabot Corp.), 0.6 gram of VISCOL® 550P polypropylene wax (from Sanyo Corp.), and 0.6 gram of BONTRON® E-84 charge control agent (from Orient Corp.).

The mixture was pulverized to a particle size of 7–12 microns using a fluid energy mill.

A developer was prepared by shaking together for 10 minutes 1 gram of toner with 9 grams of a silicone-resin coated carrier. The triboelectric charge for this developer was −22 μc/g.

EXAMPLE 16

Roller-Fusing Evaluation

The fixing properties of the toner prepared in Example 15 were determined by passing toned sheets through a roller-fuser obtained from a Kodak EK-95 copier. The toner exhibited excellent offset latitude and fusing quality.

The use of N,N,N'N'-tetra(2-hydroxyalkyl) alkylenebisamides as crosslinking agents in accordance with the present invention offers several significant advantages, including the following:

the crosslinking agents and crosslinked polyesters derived therefrom emit no objectionable odors either neat or in toners and require no hazard warning labels no special storage measures or handling precautions such as special breathing equipment, eye protection or hand protection are required the crosslinking reaction is not influenced by catalysts; therefore monitoring of catalyst in the precursor polyester or the introduction of potentially triboelectrically altering catalysts is not required the effective equivalent molecular weight is low, which translates to relatively low crosslinking agent levels on a weight basis the PRIMID® crosslinking agents are low cost, commercially available materials that are listed on the TSCA inventory the PRIMID® crosslinking agents are low melting (~120° C.) materials, which contributes to the formation of a more homogeneous crosslinked toner binder relatively low temperatures are required to effect the crosslinking reaction the reactants and crosslinked products are colorless, providing useful materials for the preparation of variously colored toners The invention has been described in detail with particular reference to certain preferred embodiments thereof, but it is to be understood that variations and modifications can be effected within the spirit and scope of the invention, which is defined by the following claims.

What is claimed is:

1. A binder polymer composition for electrostatographic toners having a viscosity, as measured on a dynamic viscometer at 120° C. and 1 radian/second, of about 20 kpoise to about 200 kpoise, and comprising:

a carboxysubstituted precursor polymer crosslinked by reaction with an N,N,N'N'-tetrakis(2-hydroxyalkyl) bisamide compound having the structure

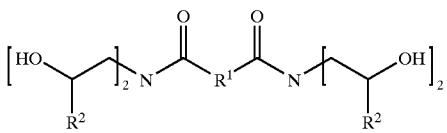

wherein $R^1$ is a substituted or unsubstituted alkylene group containing 1 to about 10 carbon atoms and $R^2$ is H or an alkyl group containing 1 to about 6 carbon atoms, and wherein said binder polymer composition contains said bisamide compound in an amount about 0.1 to about 5 weight percent of the amount of said carboxysubstituted precursor polymer.

2. The binder polymer composition of claim 1 wherein said N,N,N'N'-tetrakis(2-hydroxyalkyl) bisamide compound is selected from the group consisting of N,N,N',N'-tetrakis (2-hydroxyethyl)succinamide, N,N,N',N'-tetrakis(2-hydroxyethyl)adipamide, N,N,N',N'-tetrakis(2-hydroxyethyl)sebacamide, and N,N,N',N'-tetrakis(2-hydroxypropyl)adipamide.

3. The binder polymer composition of claim 1 wherein said carboxysubstituted precursor polymer comprises a polyester having the structure

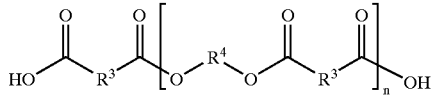

wherein $R^3$ is a substituted or unsubstituted alkylene group containing 1 to about 6 carbon atoms or a substituted or unsubstituted arylene group containing 6 to about 16 carbon atoms; $R^4$ is a substituted or an unsubstituted alkylene group containing 1 to about 6 carbon atoms, or a substituted or unsubstituted arylene, alkylenediarylene, or arylenedialkylene group containing 6 to about 20 carbon atoms.

4. The binder polymer composition of claim 3 wherein $R^3$ is selected from the group consisting of 1,2-ethanediyl, 1,2-ethenediyl, 1,4-butanediyl, hexamethylene, 1,4-phenylene, 1,3-phenylene, 4-carboxy-1,3-phenylene, 1,1,3-trimethyl-3-(4-phenylene)-5-yl, 2,6-naphthalenediyl, 5-hydroxy-1,3-phenylene, 2-chloro-1,4-phenylene, and mixtures thereof.

5. The binder polymer composition of claim 3 wherein $R^4$ is selected from the group consisting of 1,2-ethanediyl, 2,2-dimethyl-1,3-propanediyl, 2-carboxy-2-methyl-1,4-butanediyl, 1,4-cyclohexanedimethylene, hexamethylene, 2,2'-oxydiethylene, 4,4'-isopropylidenediphenylene, 1,4-phenylene, and mixtures thereof.

6. The binder polymer composition of claim 3 wherein $R^4$ in said polyester is an alkoxylated Bisphenol A residue, said polyester being formed from a glycol having the structure:

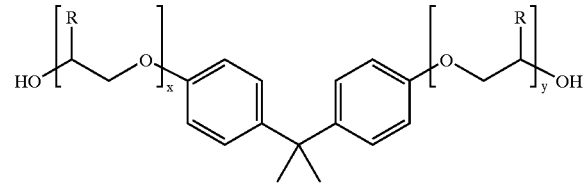

wherein R is H or $CH_3$, and x+y has a value 2.0 to 20.0.

7. The binder polymer composition of claim 6 wherein R is $CH_3$, and x+y=2.2.

8. The binder polymer composition of claim 1 wherein said carboxysubstituted precursor polymer comprises a vinyl polymer having the structure:

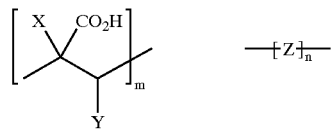

wherein X is H or $CH_3$, Y is H, $CO_2H$, $CO_2R^5$, or $CONHR^6$, wherein $R^5$ and $R^6$ each independently represents an alkyl group containing 1 to about 3 carbon atoms, Z represents the residue of at least one copolymerizable monomer, m and n are weight percentages whose total is 100, and m has a value from about 0.01 to 100.0.

9. The binder polymer composition of claim 8 wherein said copolymerizable monomers are selected from the group of olefinic, styrenic, acrylic, and methacrylic monomers, and mixtures thereof.

10. The binder polymer composition of claim 8 wherein said vinyl polymer has the formula:

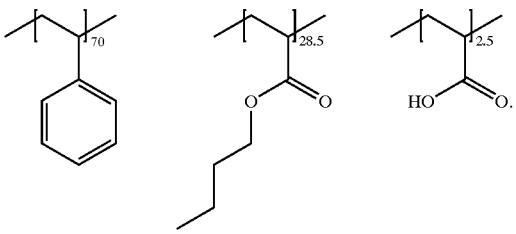

11. The binder polymer composition of claim 1 wherein said carboxysubstituted precursor polymer is selected from a mixture of carboxysubstituted polyesters, a mixture of carboxysubstituted vinyl polymers, or a mixture of one or more carboxysubstituted polyesters with one or more carboxysubstituted vinyl polymers.

12. The binder polymer composition of claim 1 wherein said carboxysubstituted precursor polymer comprises a 2,2-dimethyl-1,3-propylene terephthalate polyester.

13. The binder polymer composition of claim 1 comprising said bisamide compound in an amount about 0.5 to about 3 weight percent of the amount of said carboxysubstituted precursor polymer.

14. The binder polymer composition of claim 1 having a viscosity, as measured on a dynamic viscometer at 120° C. and 1 radian/second, of about 40 kpoise to about 140 kpoise.

15. The binder polymer composition of claim 1 having a storage modulus of at least about 20 kdyne/cm².

16. The binder polymer composition of claim 15 having a storage modulus of at least about 35 kdyne/cm².

17. A toner composition comprising the binder polymer composition of claim 1.

18. The toner composition of claim 17 further comprising addenda selected from the group consisting of pigments, dyes, charge control agents, waxes, low surface energy additives, and combinations thereof.

19. The binder polymer composition of claim 14 having a tan delta value of less than about 1.

20. A binder polymer composition for electrostatographic toners:

having a viscosity, as measured on a dynamic viscometer at 120° C. and 1 radian/second, of about 20 kpoise to about 200 kpoise;

having a tan delta value of less than about 2; and comprising a carboxysubstituted precursor polymer crosslinked by reaction with an N,N,N'N'-tetrakis(2-hydroxyalkyl) bisamide compound having the structure

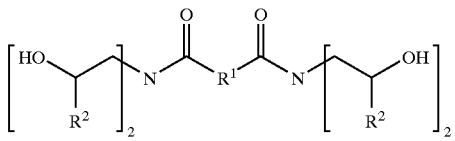

wherein $R^1$ is a substituted or unsubstituted alkylene group containing 1 to about 10 carbon atoms and $R^2$ is H or an alkyl group containing 1 to about 6 carbon atoms, and wherein said binder polymer composition contains said bisamide compound in an amount about 0.1 to about 5 weight percent of the amount of said carboxysubstituted precursor polymer.

21. The binder polymer composition of claim 20 wherein said N,N,N'N'-tetrakis(2-hydroxyalkyl) bisamide compound is selected from the group consisting of N,N,N',N'-tertrakis(2-hydroxyethyl)succinamide, N,N,N',N'-tetrakis(2-hydroxyethyl)adipamide, N,N,N',N'-tetrakis(2-hydroxyethyl)sebacamide, and N,N,N',N'-tetrakis(2-hydroxypropyl)adipamide.

22. The binder polymer of composition of claim 20 wherein said carboxysubstituted precursor polymer comprises a polyester having the structure

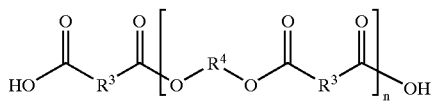

wherein $R^3$ is a substituted or unsubstituted alkylene group containing 1 to about 6 carbon atoms or a substituted or unsubstituted arylene group containing 6 to about 16 carbon atoms; $R^4$ is a substituted or an unsubstituted alkylene group containing 1 to about 6 carbon atoms, or a substituted or unsubstituted arylene, alkylenediarylene, or arylenedialkylene group containing 6 to about 20 carbon atoms.

23. The binder polymer composition of claim 22 wherein $R^3$ is selected from the group consisting of 1,2-ethanediyl, 1,2-ethenediyl, 1,4-butanediyl, hexamethylene, 1,4-phenylene, 1,3-phenylene, 4-carboxy-1,3-phenylene, 1,1,3-trimethyl-3-(4-phenylene)-5-yl, 2,6-naphthalenediyl, 5-hydroxy-1,3-phenylene, 2-chloro-1,4-phenylene, and mixtures thereof.

24. The binder polymer composition of claim 22 wherein $R^4$ is selected from the group consisting of 1,2-ethanediyl, 2,2-dimethyl-1,3-propanediyl, 2-carboxy-2-methyl-1,4-butanediyl, 1,4-cyclohexanedimethylene, hexamethylene, 2,2'-oxydiethylene, 4,4'-isopropylidenediphenylene, 1,4-phenylene, and mixtures thereof.

25. The binder polymer composition of claim 22 wherein $R^4$ in said polyester is an alkoxylated Bisphenol A residue, said polyester being formed from a glycol having the structure

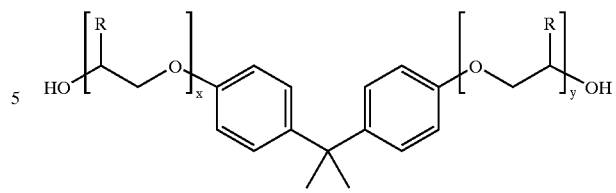

wherein R is H or $CH_3$, and x+y has a value 2.0 to 20.0.

26. The binder polymer composition of claim 25 wherein R is $CH_3$, and x+y=2.2.

27. The binder polymer composition of claim 20 wherein said carboxysubstituted precursor polymer comprises a vinyl polymer having the structure

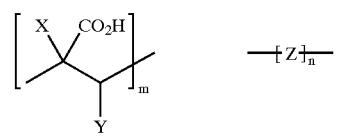

wherein X is H or $CH_3$, Y is H, $CO_2H$, $CO_2R^5$, or $CONHR^6$, wherein $R^5$ and $R^6$ each independently represents an alkyl group containing 1 to about 3 carbon atoms, Z represents the residue of at least one copolymerizable monomer, m and n are weight percentages whose total is 100, and m has a value from about 0.01 to 100.0.

28. The binder polymer composition of claim 27 wherein said copolymerizable monomers are selected from the group of olefinic, styrenic, acrylic, and methacrylic monomers, and mixtures thereof.

29. The binder polymer composition of claim 27 wherein said vinyl polymer has the formula

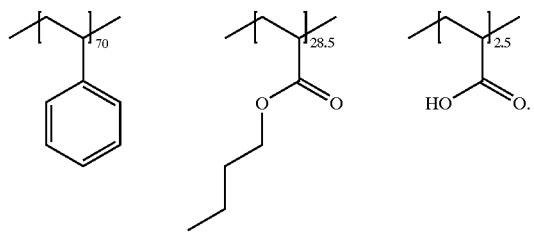

30. The binder polymer composition of claim 20 wherein said carboxysubstituted precursor polymer is selected from a mixture of carboxysubstituted polyesters, a mixture of carboxysubstituted vinyl polymers, or a mixture of one or more carboxysubstituted polyesters with one or more carboxysubstituted vinyl polymers.

31. The binder polymer composition of claim 20 wherein said carboxysubstituted precursor polymer comprises a 2,2-dimethyl-1,3-propylene terephthalate polyester.

32. The binder polymer composition of claim 20 comprising said bisamide compound in an amount about 0.5 to about 3 weight percent of the amount of said carboxysubstituted precursor polymer.

33. The binder polymer composition of claim 20 having a viscosity, as measured on a dynamic viscometer at 120° C. and 1 radian/second, of about 40 kpoise to about 140 kpoise.

34. The binder polymer composition of claim 20 having a storage modulus of at least about 20 $kdyne/cm^2$.

35. The binder polymer composition of claim 34 having a storage modulus of at least about 35 kdyne/cm$^2$.

36. The binder polymer composition of claim 20 having a tan delta value of less than about 1.

37. A toner composition comprising the binder polymer composition of claim 20.

38. The toner composition of claim 37 further comprising addenda selected from the group consisting of pigments, dyes, charge control agents, waxes, low surface energy additives, and combinations thereof.

* * * * *